United States Patent [19]
Aoki

[11] Patent Number: 5,294,990
[45] Date of Patent: Mar. 15, 1994

[54] ELECTRONIC STILL CAMERA

[75] Inventor: Harumi Aoki, Iruma, Japan

[73] Assignee: Asahi Kogaku Kogyo Kabushiki Kaisha, Tokyo, Japan

[21] Appl. No.: 551,168

[22] Filed: Jul. 11, 1990

[30] Foreign Application Priority Data

| Jul. 14, 1989 | [JP] | Japan | 1-182158 |
| Jul. 25, 1989 | [JP] | Japan | 1-191984 |
| Jul. 25, 1989 | [JP] | Japan | 1-191985 |
| Jul. 25, 1989 | [JP] | Japan | 1-191986 |
| Jul. 25, 1989 | [JP] | Japan | 1-191987 |
| Jul. 25, 1989 | [JP] | Japan | 1-191988 |

[51] Int. Cl.$^5$ ............................................. H04N 3/14
[52] U.S. Cl. ................................. 348/363; 358/342; 358/906; 358/909.1; 360/33.1; 348/230; 348/349
[58] Field of Search ............... 360/33.1; 358/310, 209, 358/335, 342, 906, 909, 213.11–213.19, 213.23, 44, 47, 222, 225, 227; 354/33.1

[56] References Cited

U.S. PATENT DOCUMENTS

| 4,312,580 | 1/1982 | Schwomma et al. | 354/64 |
| 4,470,680 | 9/1984 | Inagaki | 354/402 |
| 4,634,253 | 1/1987 | Tamamura | 354/403 |
| 4,757,387 | 7/1988 | Saito | 358/213.13 |
| 4,819,074 | 4/1989 | Suzuki | 358/213.13 |
| 4,825,302 | 4/1989 | Tezuka et al. | 358/906 |
| 4,890,166 | 12/1989 | Kimura et al. | 358/909 |
| 4,963,913 | 10/1990 | Shindo et al. | |
| 5,038,214 | 8/1991 | Miida | 358/213.11 |

FOREIGN PATENT DOCUMENTS

| 0196009 | 10/1986 | European Pat. Off. |
| 59-011071 | 1/1984 | Japan |
| 64-68181 | 3/1989 | Japan |
| 2172168 | 9/1986 | United Kingdom |
| 2203312 | 10/1988 | United Kingdom |

Primary Examiner—Aristotelis Psitos
Assistant Examiner—Muhammad N. Edun
Attorney, Agent, or Firm—Sandler Greenblum & Bernstein

[57] ABSTRACT

An electronic still camera is disclosed for recording image data on a recording medium. A photographing optical system is provided for passing therethrough light from a photographing object and forming an image of the object. A pickup element such as CCD (Charge Coupled Device) is provided for receiving the light passed through the photographing optical system and outputting an image signal corresponding thereto. The image is to be formed on the light receiving surface of the pickup element. A drive mechanism drives the pickup element to be shifted between at least a first position where the light passed through the photographing optical system is incident to the pickup element and a second position which differs from the first position. A recording circuit records the image signal outputted from the pickup element onto a recording medium such as a magnetic disk.

39 Claims, 16 Drawing Sheets

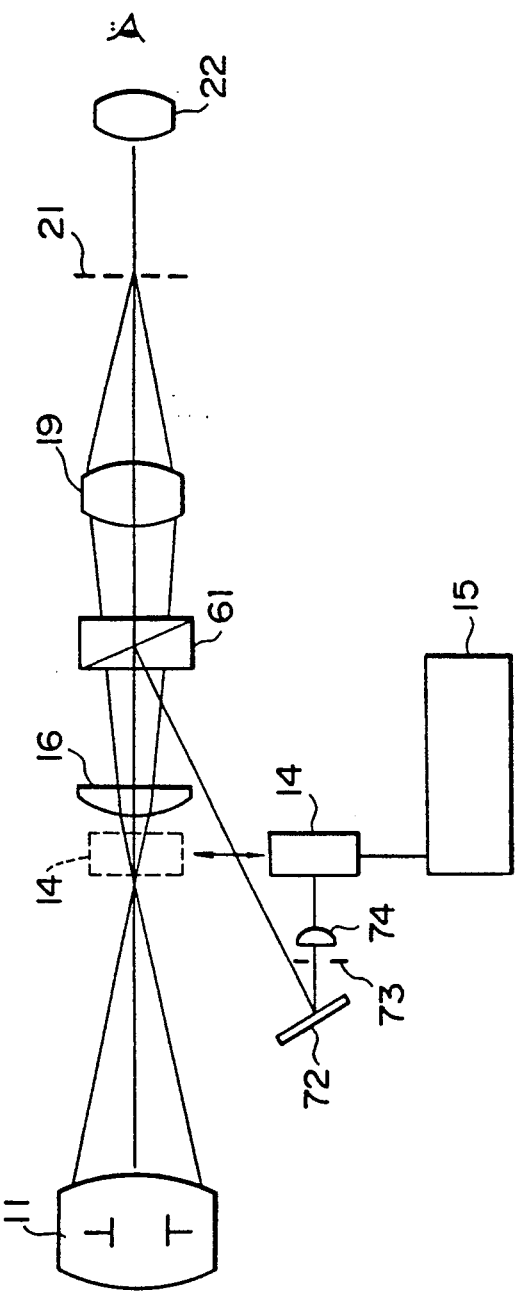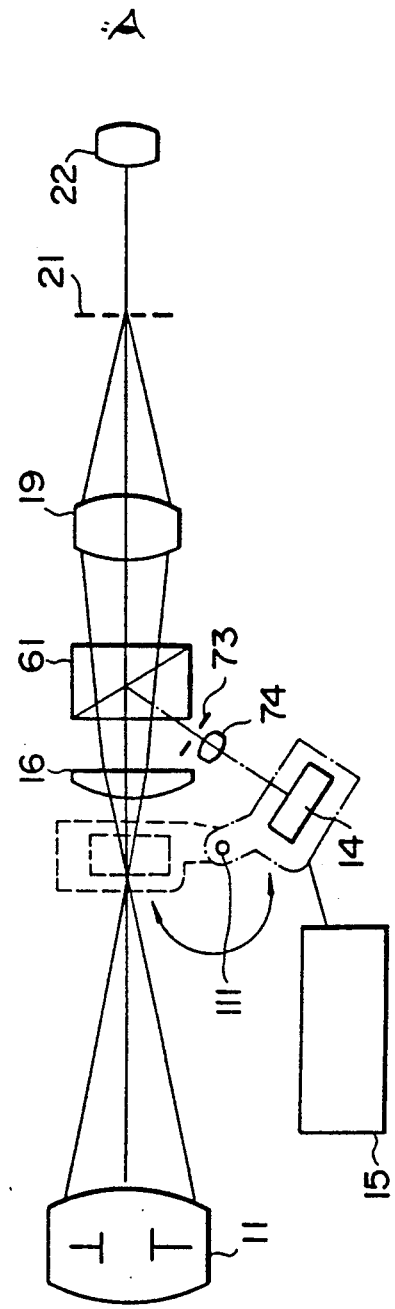
FIG. 17
FIG. 18

131

131

ELECTRONIC STILL CAMERA

BACKGROUND OF THE INVENTION

The present invention relates to an electronic still camera capable of recording images of objects on a recording medium such as a magnetic disk.

In a conventional electronic still camera of a so-called single-lens reflex type as illustrated in FIG. 1, a lens 1 causes light from an object, not shown, to be incident on a pickup element 2. A quick return mirror 3 reflects the light from the lens 1 and causes it to be incident on a finder 5. A shift mechanism 4 drives the quick return mirror 3. A mirror 6 is fitted to the back side of the mirror 3 and capable of revolving, so that part of pickup luminous flux is caused to be incident on a photometric element 7.

While a release switch (not shown) is not held on, the quick return mirror 3 is located as shown by the solid line in FIG. 1. As the light passed through the lens 1 and is reflected from the quick return mirror 3 and caused to be incident on the finder 5 in the way stated above, the subject can be monitored via the finder 5, the quick return mirror 3 and the lens 1.

Moreover, the light passed through the quick return mirror 3, which is a half mirror, is reflected from the mirror 6 and caused to be incident on the photometric element 7. As a result, aperture value, shutter speed and the like can be computed from the output of the photometric element 7.

When the release switch is turned on, the shift mechanism 4 operates to move the quick return mirror 3 together with the mirror 6 upward (to the position indicated by the dashed (imaginary) line). Consequently, the light from the lens 1 is caused to be incident on the pickup element 2; thus the output of the pickup element 2 can be recorded on a recording medium such as a magnetic disk.

After this pickup and recording operation has been terminated, the quick return mirror 3 is returned back to the original position.

Since the quick return mirror 3 is thus disposed between the lens 1 and the pickup element 2 in the conventional electronic still camera of the so-called single-lens reflex type, the distance (back focal distance) between the back surface of the lens 1 and an image forming position (where the pickup element 2 has been disposed) has to be set large. In order to obtain a desired f-number with the large back focal distance, a large lens 1 will have to be used accordingly. Further, the quick return mirror 3 must be large in size. Although the back focal distance may be decreased to a certain extent by reducing the size of the quick return mirror 3, the amount of light incident to the finder 5 decreases, thus causing the brightness of the finder field to be reduced. Consequently, the size of the quick return mirror 3 cannot be reduced so much as desired.

In the conventional electronic still camera, the photometric element 7 has to be equipped besides (adjacent to) the pickup (photographing) element 2. Further, a TTL (through the taking lens) system is required in order to obtain an accurate exposure time. Still further, if the camera employs the quick return mirror system, additional mirror 6, as described above, is necessary for directing the light to the photometric element 7, which makes the mechanism more complex.

As above, it has been hardly possible to make a compact electronic still camera of the single-lens reflex type.

SUMMARY OF THE INVENTION

It is therefore an object of the present invention to provide an improved electronic still camera which is compact in size without aforesaid disadvantages.

For the above object, according to the invention, there is provided an electronic still camera for recording an image data on a recording medium.

A photographing optical system is provided for passing light from a photographing object therethrough and forming an image of the object.

A pickup element receives the light passed through the photographing optical system and outputs an image signal corresponding thereto. The image to be recorded is formed on the light receiving surface of the pickup element.

A drive mechanism drives the pickup element to be shifted between at least a first position where the light passed through the photographing optical system is incident on the pickup element and a second position which differs from the first position.

A recording means records the image signal outputted from the pickup element onto the recording medium.

In the electronic still camera thus constructed, the pickup element (such as a CCD) is disposed in a luminous flux path of incident light passed through the photographing lens while a photograph is taken, whereas it is disposed outside the luminous flux path thereof when no photograph is taken. Thereby a quick return mirror becomes unnecessary and a photographing lens having a relatively small back focal distance can be utilized. The incident light passed through the photographing lens can be led directly to the finder optical system when no photograph is taken, and a bright finder image can be obtained. Moreover, since the pickup element is shifted within the imaging plane on which an image of the object is formed by the photographing lens and the imaging area becomes smallest on the plane, the shifting amount of the pickup element can be set relatively small.

Further, since the pickup element is located in a luminous flux path only when the photograph is taken and the pickup element is actuated when power is supplied thereto, no mechanical shutter mechanism is necessary.

Computing means for computing exposure time and aperture value based on the output of the pickup means is provided; therefore, the exposure time and aperture value can be determined precisely without the TTL system. Still further, the camera can be provided with image memory means for storing image data photographed by operating the diaphragm means and actuating the pickup element based upon the exposure time and the aperture value computed by the computing means, and the computing means computes at least another exposure time and at least another aperture value based on the image data previously stored in the image memory means.

Optionally, the camera can be so designed that when power is not supplied, or when the camera is not in use, the diaphragm is completely closed.

Still further, the pickup element can be used as a photometric element for focusing when it is located at the second position.

Furthermore, the pickup element can be used as a colorimetric means for detecting color temperature when located at the second position, by directing the light passed through the photographing lens to the pickup element through an additional optical system and a light diffusion optical element.

Further, when an optical low-pass filter or the like is employed, the electronic still camera according to the present invention can be arranged in such a manner that the light passed through the optical low-pass filter is incident on the finder optical system. Otherwise, the optical low-pass filter is moved with the pickup element and the light is incident on the finder optical system without passing through the optical low-pass filter.

It should be noted that the pickup element can be used as said photometric element and colorimetric element simultaneously.

Thus a sufficiently compact electronic still camera can actually be obtained.

DESCRIPTION OF THE ACCOMPANYING DRAWINGS

FIG. 17 is a schematic side view of the optical system of the second modification of the second embodiment;

FIG. 18 is a schematic side view of the optical system of the third modification of the second embodiment;

DESCRIPTION OF THE EMBODIMENTS

Figure 1:
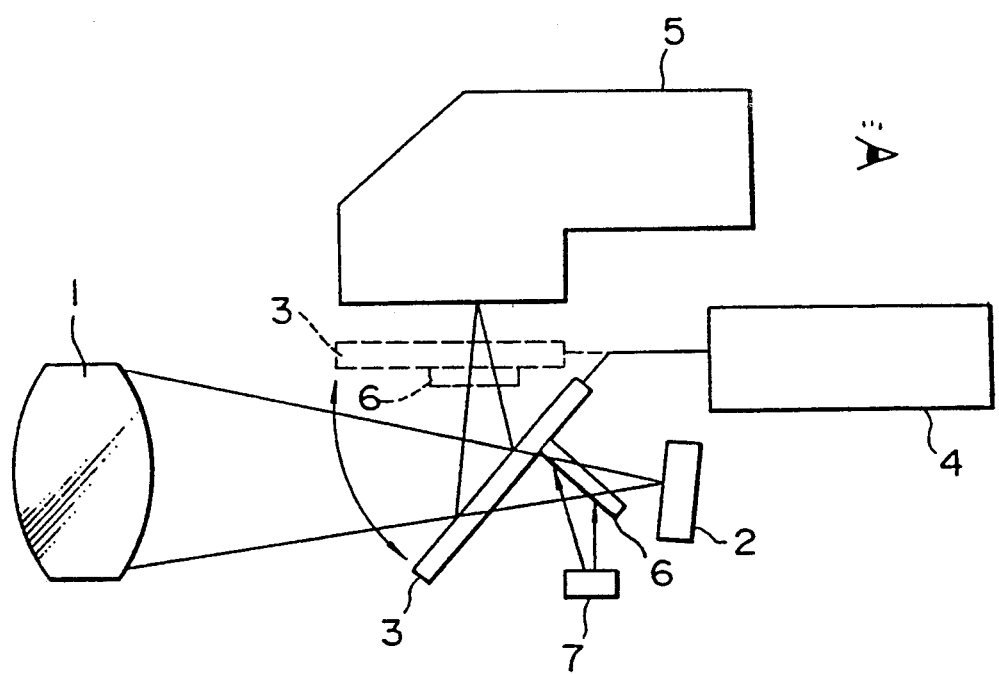
FIG. 1 is a block diagram of an electronic still camera of the conventional single-lens reflex type.
Figure 2:
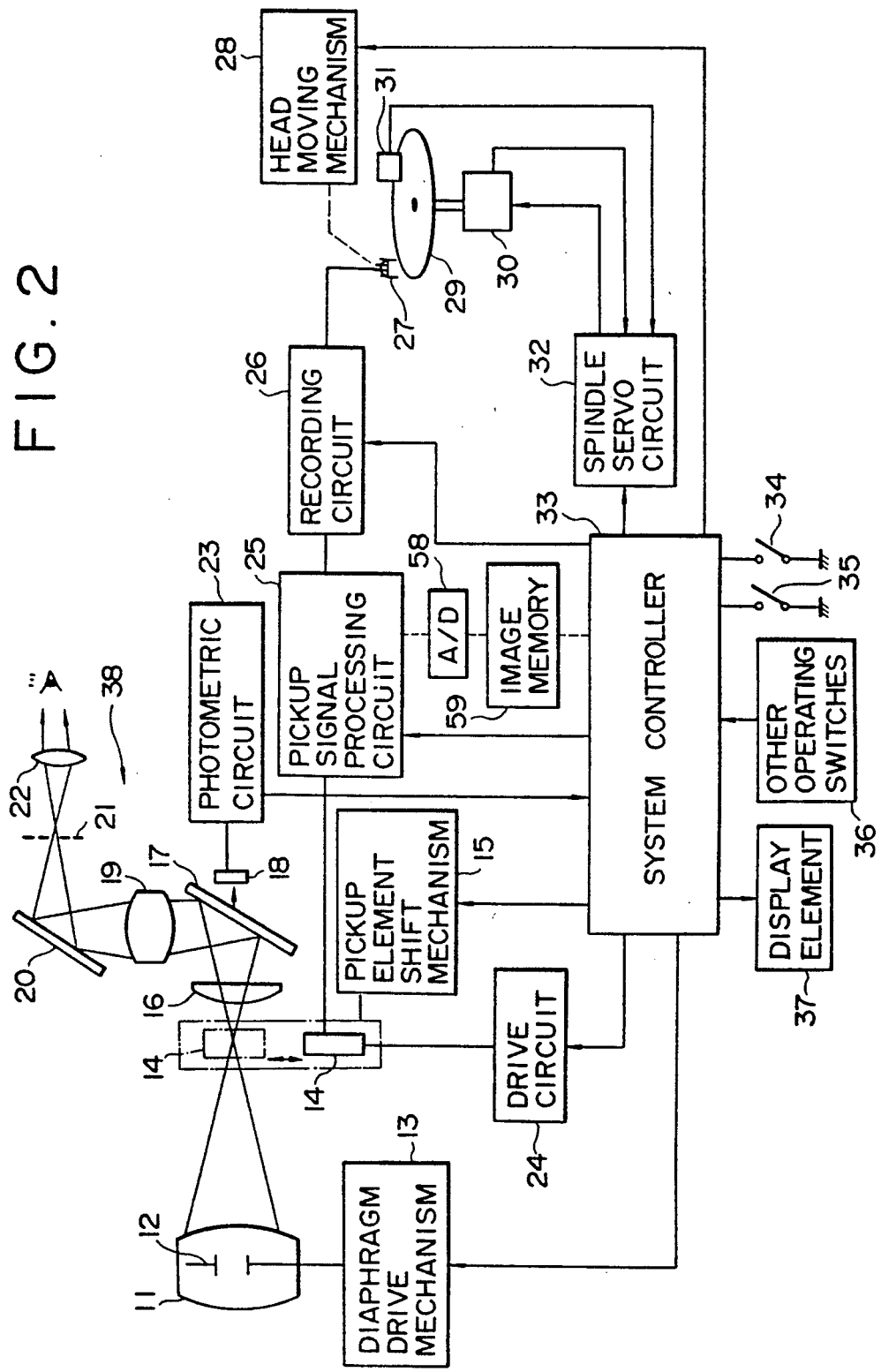
FIG. 2 is a block diagram of a first embodiment of an electronic still camera according to the present invention.

FIG. 2 is a block diagram illustrating a first embodiment of an electronic still camera according to the present invention.

As shown in FIG. 2, the electronic still camera comprises a lens 11 for converging rays of light from an object (not shown), a diaphragm 12 which is driven by a diaphragm drive mechanism 13 to be set at a predetermined aperture value, a CCD (Charge Coupled Device) 14 as a pickup element on which the light from the lens is incident, and a shift mechanism 15 for moving the pickup element 14.

The camera contains a field lens 16, a mirror 17, a relay lens 19, mirror 20, a re-imaging plane 21, and an eyepiece lens 22, these constituting an optical finder 38.

The camera further contains a photometric element 18 on which the light passed through the mirror 17 (a half mirror in this embodiment) is incident, the output of the photometric element 18 being supplied to a photometric circuit 23.

The camera further contains a drive circuit 24 for driving the CCD 14 to have its output supplied to a processing circuit 25, and a recording circuit 26 for supplying the output of the processing circuit 25 to a magnetic head 27. A head moving mechanism 28 moves the magnetic head 27 to a predetermined track of a magnetic disk 29 which is rotated by a spindle motor 30. A detection coil 31 detects and outputs a pulse PG from the magnetic disk 29. The pulse PG is output in correspondence with the rotation of the magnetic disk 29. A spindle servo circuit 32 controls the spindle motor 30.

The camera still further contains a system controller 33 for controlling respective circuit, means and the like. The system controller 33 comprises a microcomputer and, for instance, a power supply switch 34 for being operated when a power supply is turned on/off, a release switch 35 for being turned on when the pickup operation (photographing) is performed, switches 36 for being operated when other predetermined operations are performed, and a display element 37 for displaying data necessary for the pickup operation.

Figure 3:
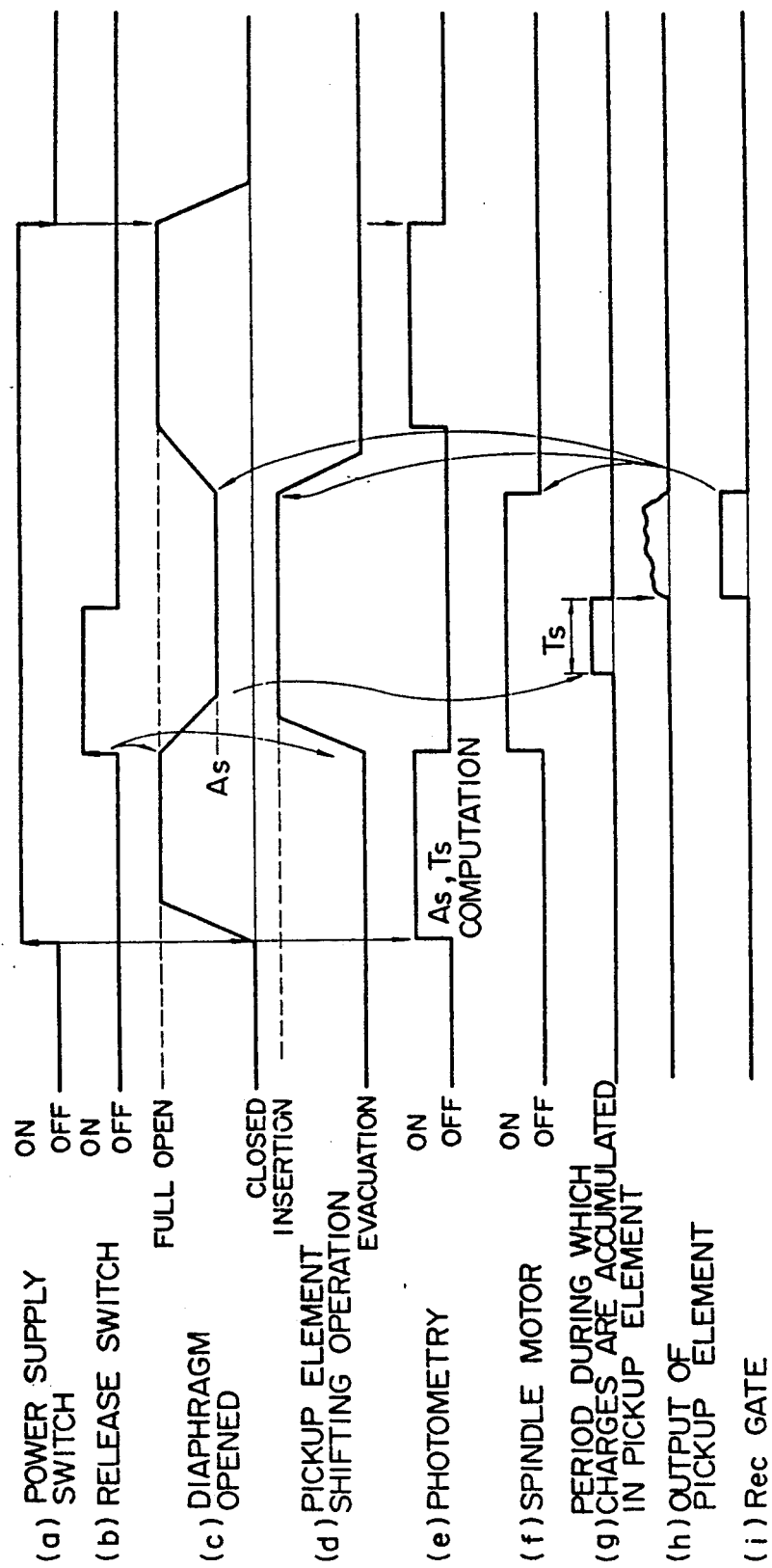
FIG. 3 is a timing chart illustrating the operation of the first embodiment.

The operation will now be described with reference to a timing chart of FIG. 3.

When the power supply switch 34 is turned on, the power is supplied to each circuit or means. At this time, the system controller 33 drives the drive mechanism 13 in order to completely open the diaphragm 12 that has been closed until then (FIGS. 3(a), (c)).

Alternately, it is possible to make the diaphragm completely closed when in use (i.e., when the power supply is held on) while it is kept fully open when not in use (i.e., when the power supply is held off). However, the CCD 14 may inadvertently be exposed to intense light and then deteriorated because no mechanical shutter is installed if the diaphragm 12 is left open when not in use. Consequently, it is preferred that the diaphragm be kept closed while it is not in use as the above embodiment.

At that time, moreover, the CCD 14 is located at the position shown by a continuous line of FIG. 2, that is, outside the pickup (photographing) luminous flux path of the lens 11. The light derived from the object and passed through the lens 11 is therefore focused on the re-imaging plane 21 via the field lens 16, the mirror 17, the relay lens 19 and the mirror 20.

Consequently, the image of the object can be monitored through the eyepiece lens 22.

Part of the light emitted from the field lens 16 passes through the mirror 17 and enters the photometric element 18. After processing the output of the photometric element 18 for computing exposure value, the photometric circuit 23 transmits the output thus processed to the system controller 33. The system controller 33 computes an appropriate aperture value $A_s$ and the operating time interval $T_s$ of the electronic shutter of the CCD 14 (refer to FIG. 3(e)) based upon the data thus supplied.

When the release switch 35 is turned on, the system controller 33 controls the drive mechanism 13 to drive the diaphragm 12 and make the drive mechanism 13 set the aperture value $A_s$ thus computed (FIGS. 3(b), (c)). Moreover, the system controller 33 controls the shift mechanism 15 so as to move the CCD 14, which has been placed outside the luminous flux path of the lens 11, to be place inside the luminous flux path. The controller 33 further controls the spindle servo circuit 32 to drive the spindle motor 30 to rotate the magnetic disk 29 (FIGS. 3(d), (f)). At this time, the spindle servo circuit 32 controls the spindle motor 30 based upon a pulse FG supplied from the spindle motor 30 and the pulse PG supplied from the detection coil 31 so that the number of rotations of the magnetic disk 29 becomes constant. The pulse FG carries the data of the rotational speed of the spindle motor 30.

When the diaphragm is set to an appropriate value, the system controller 33 controls the drive circuit 24 so as to make the CCD 14 store an electric charge corresponding to the light from the lens during the time interval $T_s$. In other words, the electronic shutter is operated for the time interval $T_s$ (FIG. 3(g)).

When the time interval $T_s$ has elapsed, the charge stored in the CCD 14 is read out and supplied to the processing circuit 25 (FIG. 3(h)). The image signal processed in the processing circuit 25 is transmitted to the recording circuit 26 and then modulated into a FM (frequency-modulated) signal. Since a gate pulse instructing the recording operation has been supplied to the recording circuit 26 (FIG. 3(i)), the recording circuit is caused to output the FM signal to the magnetic head 27 and to have the FM signal recorded on one track of the magnetic disk 29.

After the termination of the recording operation, the system controller 33 controls the head moving mechanism 28 so as to move the magnetic head 27 to a track by one inner track. Moreover, the system controller 33 makes the diaphragm 12 open completely, retracts the CCD 14 outside the light path, and controls the magnetic disk 29 to stop rotating (FIGS. 3(c), (d), (f)).

Then the aperture value $A_s$ and the time interval value $T_s$ are computed for another photographing (FIG. 3(e)).

When the power supply switch 34 is turned off, the diaphragm 12 is shut and the metering operation is also terminated (FIGS. 3(a), (c), (e)).

Since the CCD 14 shifts within the image forming plane of the lens 11, the shifting amount can be set smaller than that in the case of the quick return mirror.

Figure 4:
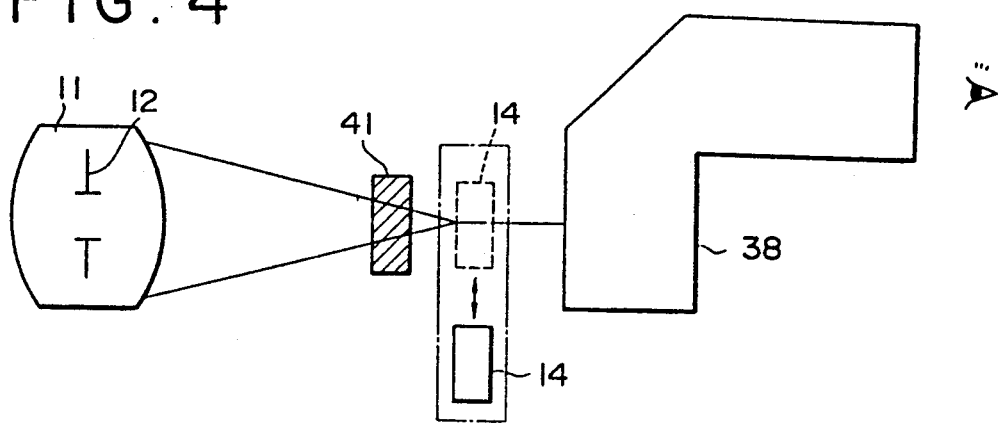
FIGS. 4 and 5 are block diagrams of first and second modifications of the first embodiment with a low-pass filter inserted.
Figure 5:
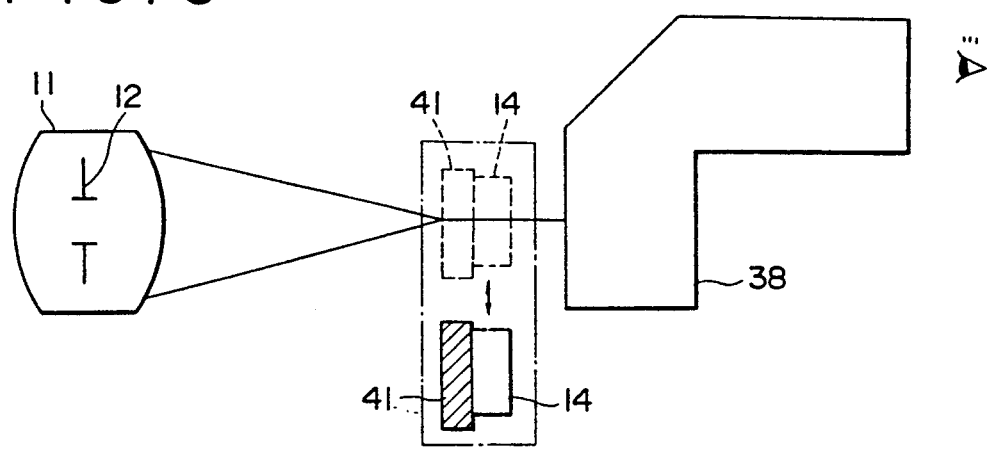

FIGS. 4 and 5 show first and second modifications of the first embodiment, wherein the electronic still camera is provided with an optical low-pass filter.

In the first modification shown in FIG. 4, an optical low-pass filter (crystal optical filter) 41 is fixedly provided in the luminous flux path of the lens 11, whereas in the second modification shown in FIG. 5, the optical low-pass filter 41 is incorporatively fixed on the light receiving surface of the CCD 14 and made movable within the plane orthogonal to the optical axis of the lens 11. The optical low-pass filter is utilized for preventing a moire phenomenon and generation of a pseudo color signal, which depends on the sampling of the CCD 14.

In the first modification of FIG. 4, the advantage is that the load applied to the shift mechanism 15 is relatively lighter than what is shown in FIG. 5 as the optical low-pass filter 41 is fixed in the optical axis. Moreover, the light passed through the optical low-pass filter 41 is caused to be incident on the optical finder 38 directly. As a result, although an image is viewed via the optical low-pass filter 41 and theoretically seen multiplexed, there is almost no problem as it is a case within a microscopic range.

On the other hand, in the second modification of FIG. 5, the optical low-pass filter 41 can be installed adjacent to the CCD 14 and therefore made smaller than the case of FIG. 4. As the optical low-pass filter 41 is disposed outside the luminous flux path while no photograph is taken, the optical finder 38 can be used to monitor an object without the optical low-pass filter 41.

Since the optical low-pass filter 41 is disposed at the preceding stage of the CCD 14 in both the first and second modifications, the appearance of moire phenomenon is efficiently prevented.

It should be noted that, the direction in which the CCD 14, the optical low-pass filter 41 and the like are moved should not be necessarily orthogonal to the optical axis of the lens 11. Moreover, the CCD 14 and the like may be so arranged that, by causing the light from the lens 11 to be reflected in a predetermined direction using the mirror, they are moved inside and outside the reflex optical path.

Figure 6:
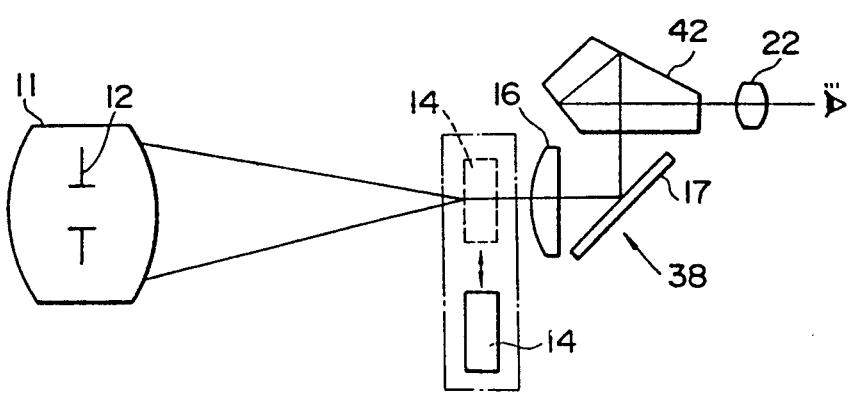
FIGS. 6 and 7 are block diagrams showing optical finders of third and fourth modifications of the first embodiments.
Figure 7:
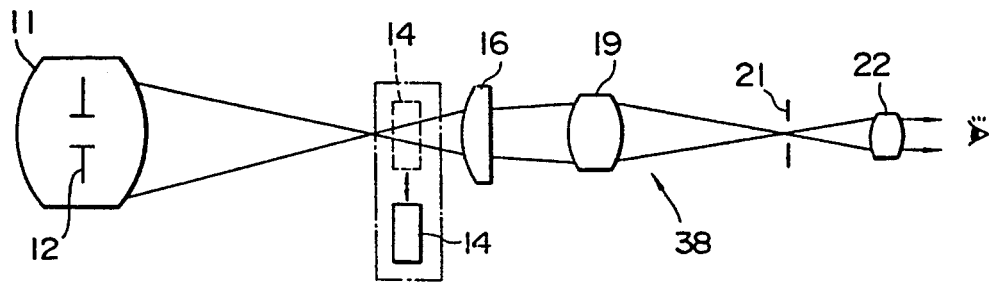

FIGS. 6 and 7 show the optical finder 38 according to third and fourth modifications of the first embodiment.

In the third modification of FIG. 6, the relay lens 19 and the mirror 20 are replaced with a pentagonal prism 42.

In the fourth modification of FIG. 7, the mirror 17 and the mirror 20 are omitted, whereas the optical finder 38 and the lens 11 are disposed coaxially with respect to the optical axis of the lens 11.

Figure 8:
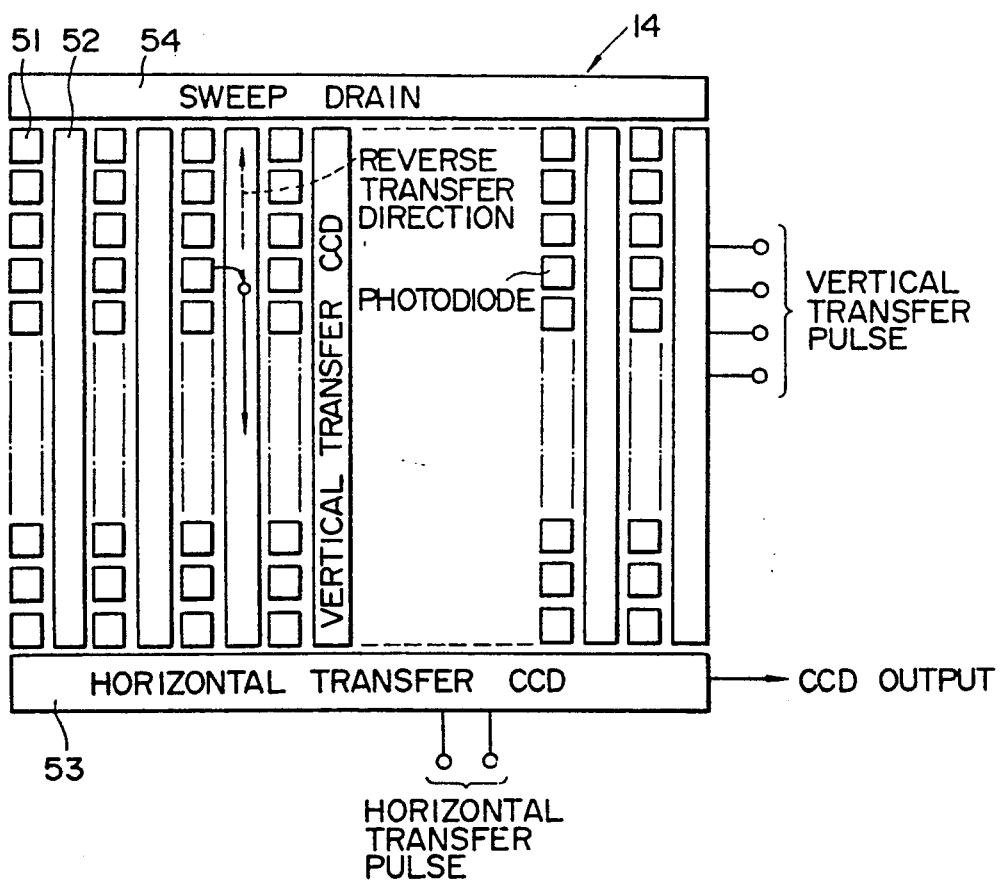
FIG. 8 is an elevational view of an interline type CCD.

FIG. 8 shows the construction of an interline type CCD.

As shown in FIG. 8, the interline type CCD 14 consists of photodiodes 51 constituting respective pixels, vertical trasfer CCD's 52, horizontal transfer CCD's 53, and a sweep drain 54.

When the charges stored in the respective photodiodes 51 constituting the pixels are not required, they are transferred to the adjoining vertical transfer CCD 52 and to the sweep drain 54, and then eliminated. On the other hand, the charge required is transferred to the horizontal transfer CCD 53, and then it is read from the horizontal transfer CCD 53.

Figure 9:
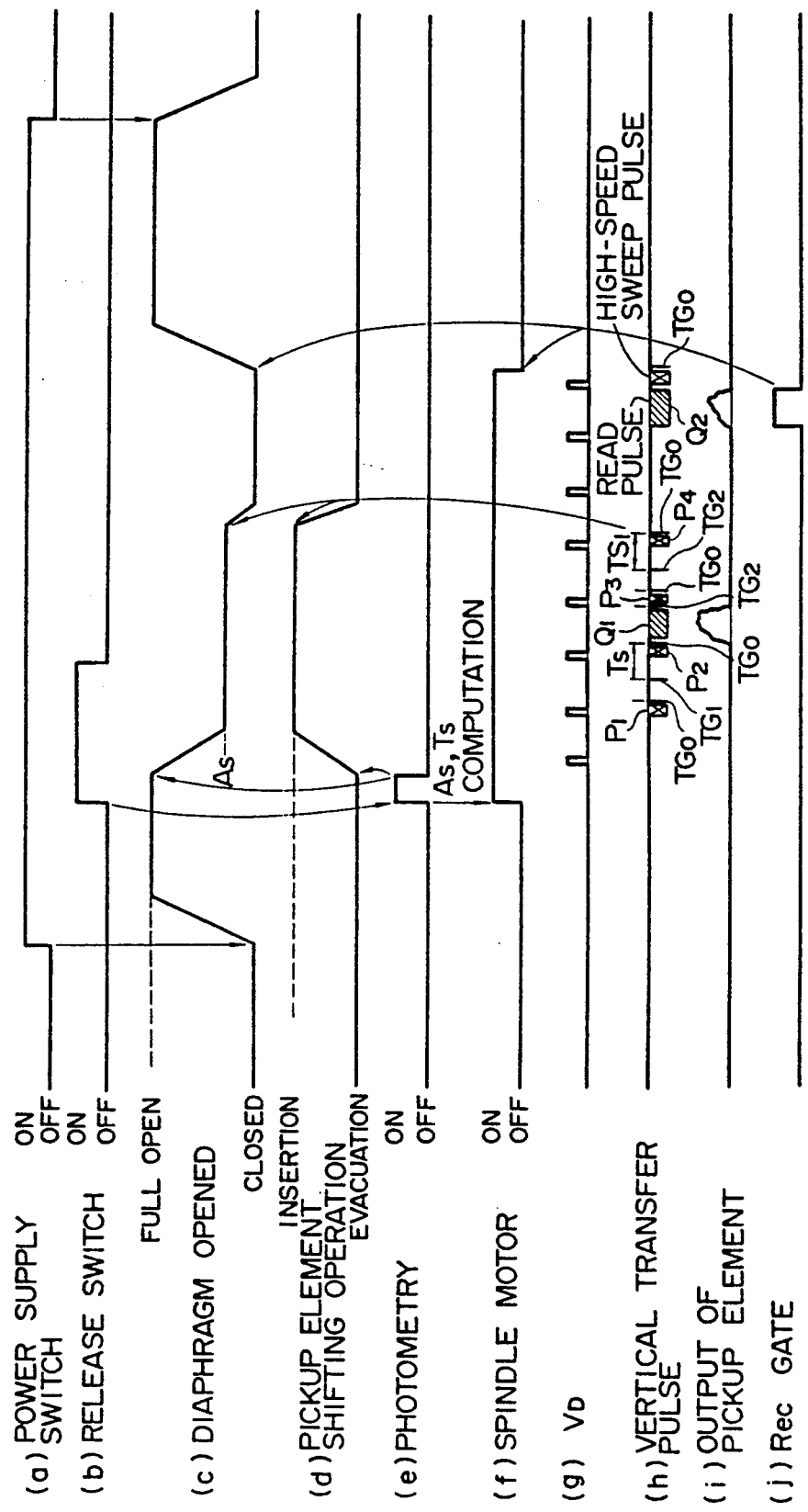
FIG. 9 is a timing chart illustrating the operation of the first embodiment using the interline type CCD.

When the interline type CCD is employed as the CCD 14, an A/D converter 58 and an image memory 59 are connected between the processing circuit 25 and the system controller 33 so that the operations shown in a timing chart of FIG. 9 can be performed.

When the power supply switch 34 is turned on, the completely closed state of the diaphragm 12 is changed to its completely opened state (FIGS. 9(a), (c)). Next, when the release switch 35 is turned on (FIG. 9(b)), the magnetic disk 29 is rotated (FIG. 9(f)) and the aperture value $A_s$ and the time interval $T_s$ of the electronic shutter of the CCD 14 are simultaneously computed based upon the output of the photometric circuit 23 (FIG. 9(e)). When the computation is terminated, the CCD 14 is shifted from the outside to the inside of the luminous flux path of the lens 11. The diaphragm 12 is driven in accordance with the results of computation (FIGS. 9(c), (d)).

Further, a high-speed sweep pulse P1 (FIG. 9(g)) is applied to the CCD 14 in synchronization with a vertical synchronizing signal and the unnecessary charge is transferred through the vertical transfer CCD 52 to the sweep drain 54. Moreover, the charges that have so far been stored in the respective photodiodes 51 of the pixels are immediately transferred to the vertical transfer CCD 52 because of the pulse $TG_o$ generated in every field. Subsequently, a pulse $TG_1$ is generated prior by the time interval $T_s$ to the pulse $TG_o$ corresponding to the following field and the charge in the photodiode 51 is transferred to the vertical transfer CCD 52. These charges are transferred by the following high-speed sweep pulse $P_2$ to the sweep drain 54 as unnecessary ones (FIG. 9(h)). During the time interval $T_s$ thus computed, the electric charges stored in the respective photodiodes 51 of the respective pixels are transferred by the last pulse $TG_0$ during the time interval $T_s$ to the vertical transfer CCD 52. Further, the charges are transferred by a read pulse $Q_1$ to the horizontal transfer CCD 53, converted into voltage, and then applied to the processing circuit 25 (FIGS. 9(h), (i)).

The image signal is processed in the processing circuit 25 and converted into a digital signal in the A/D converter 58, the signal thus converted being stored in the image memory 59.

Based upon the data stored in the image memory 59, the system controller 33 computes the operating time interval $Ts_1$ of the electronic shutter again. High-speed sweep pulses $P_3$, $P_4$ are applied to send the unnecessary charges to the sweep drain 54 and the electronic shutter is operated again by the newly computed time interval $Ts_1$ (FIG. 9(h)).

After the time interval $Ts_1$ has elapsed, the diaphragm 12 is closed once (FIG. 9(c)), which prevents the CCD 14 from being exposed to the light during transferring the charge, and a so-called smear phenomenon is prevented.

When the time interval long enough for preventing the smear phenomenon has elapsed after the diaphragm 12 was closed, an image signal is read from the CCD 14 in response to a read pulse $Q_2$. Since this image is obtained by operating the electronic shutter by the time interval $Ts_1$ computed based upon the image data actually stored once during the time interval $T_s$, the exposure time has been set accurately. It is this image signal that is recorded on the magnetic disk 29 (FIG. 9(j)).

When this recording operation has been completed, the rotation of the magnetic disk 29 is terminated (FIG. 9(f)) and the diaphragm 12 is completely opened (FIG. 9(c)).

When the power supply switch 34 is turned off, the diaphragm 12 is completely closed (FIGS. 9(a), (c)).

Figure 10:
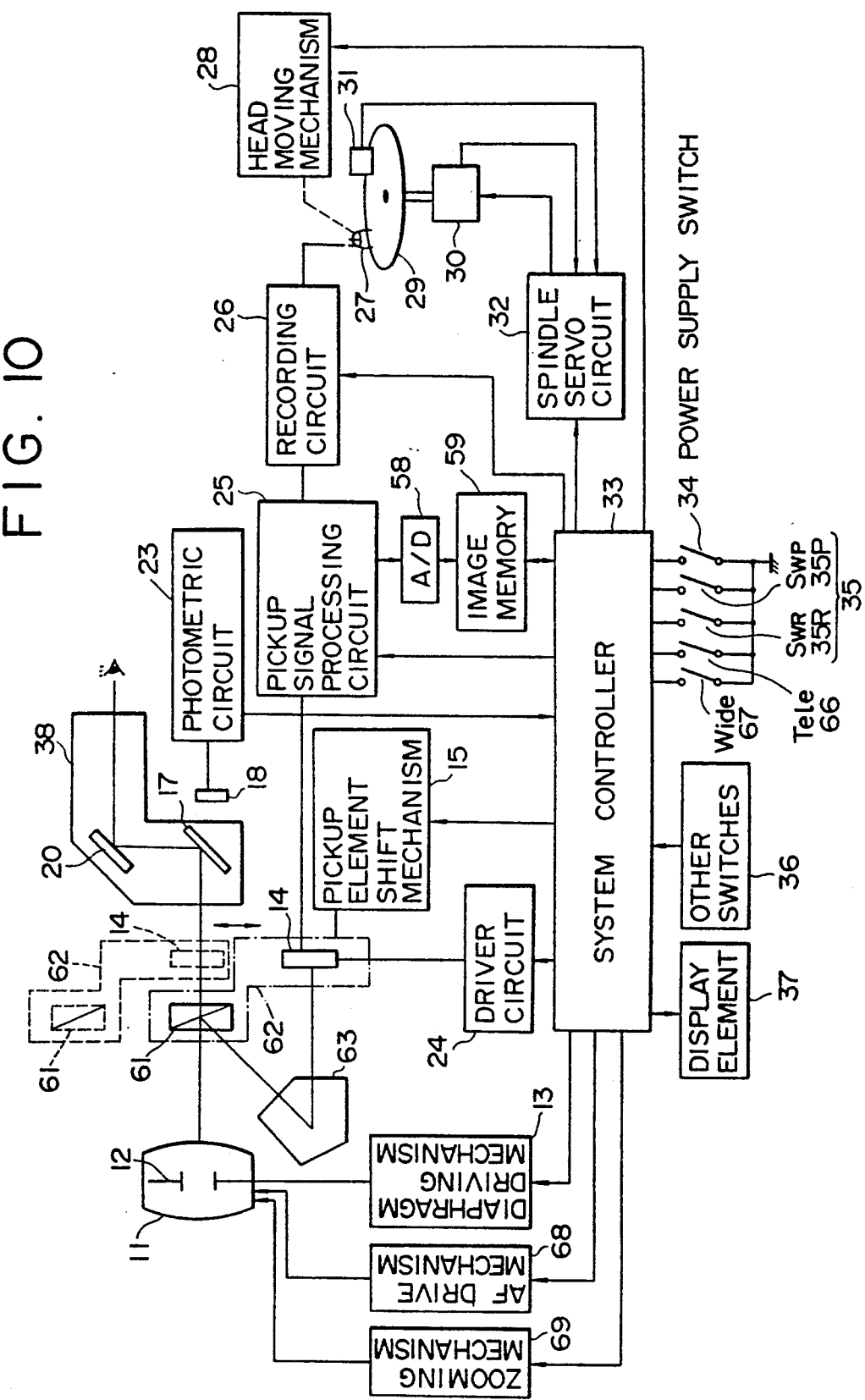
FIG. 10 is a block diagram illustrating the second embodiment of an electronic still camera according to the present invention.

FIG. 10 is a block diagram illustrating a second embodiment of an electronic still camera according to the present invention, wherein the same reference characters as in FIG. 2 designate corresponding parts thereof.

As shown in FIG. 10, a beam splitter 61, together with the CCD 14, is fitted to a base plate 62. The beam splitter 61 divides rays of incident light from the lens 11. The transmitted light is supplied to the optical finder 38, and the reflected light to an optical block 63 for detecting a focal point.

A tele switch 66 and a wide switch 67 are operated when a zoom lens contained in the lens 11 is moved by means of a zooming mechanism 69 for zooming. An automatic focus drive mechanism 68 is used to drive the lens 11 for automatic focus adjustment.

The remaining arrangement is the same as shown in FIG. 2.

Figure 11:
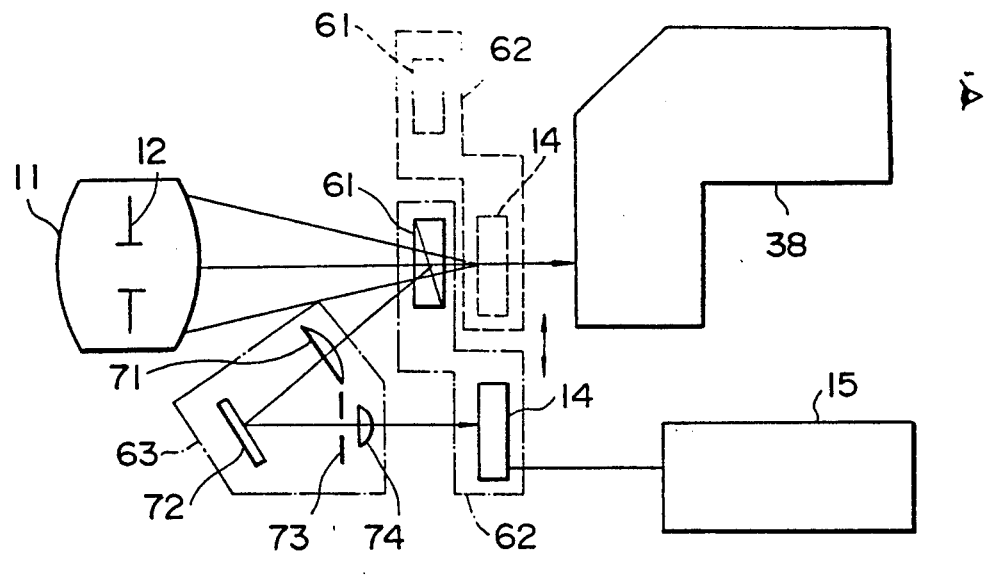
FIG. 11 is a side view illustrating the construction of an optical block for focusing.
Figure 12:
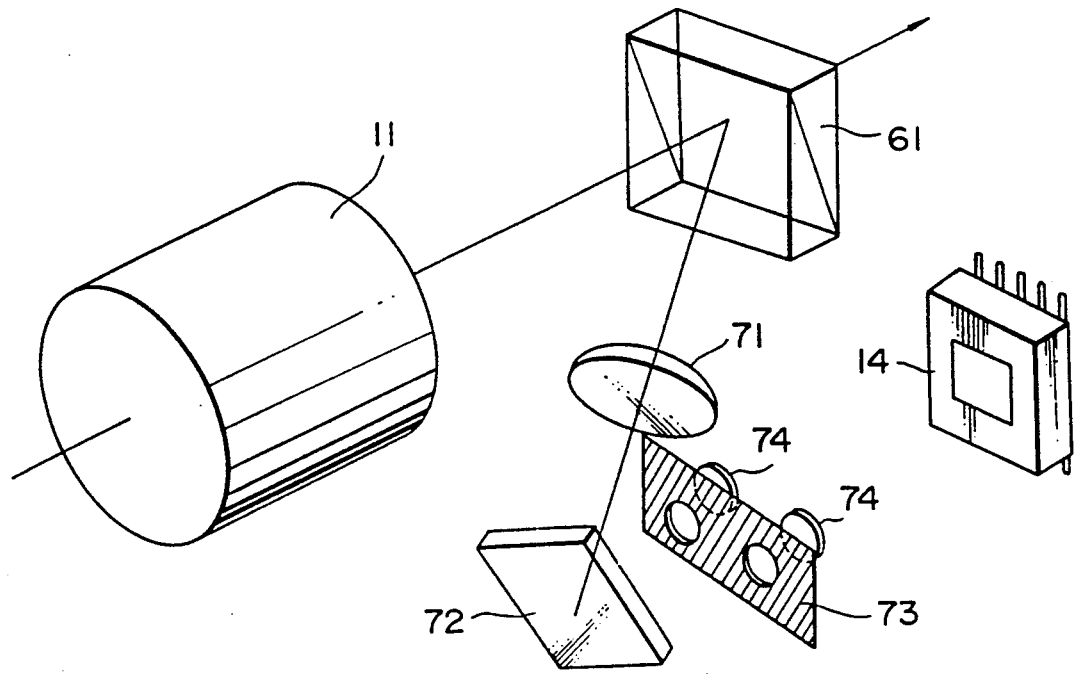
FIG. 12 is a perspective view of the optical block for focusing.

FIGS. 11 and 12 illustrate in detail an optical block 63 for detecting a focal point.

As shown in the figures, the optical block 63 contains a field lens 71, a mirror 72, a mask 73, and a separator lens 74.

When the base plate 62 is positioned downward as shown by one-dot lines in FIG. 11, the beam splitter 61 is disposed in the luminous flux path of the incident light from the lens 11 and the light passed therethrough is incident to the finder 38. Moreover, the light reflected from the beam splitter 61 is incident on the CCD 14 via the field lens 71, the mirror 72, the mask 73 and the separator lens 74.

Figure 13:
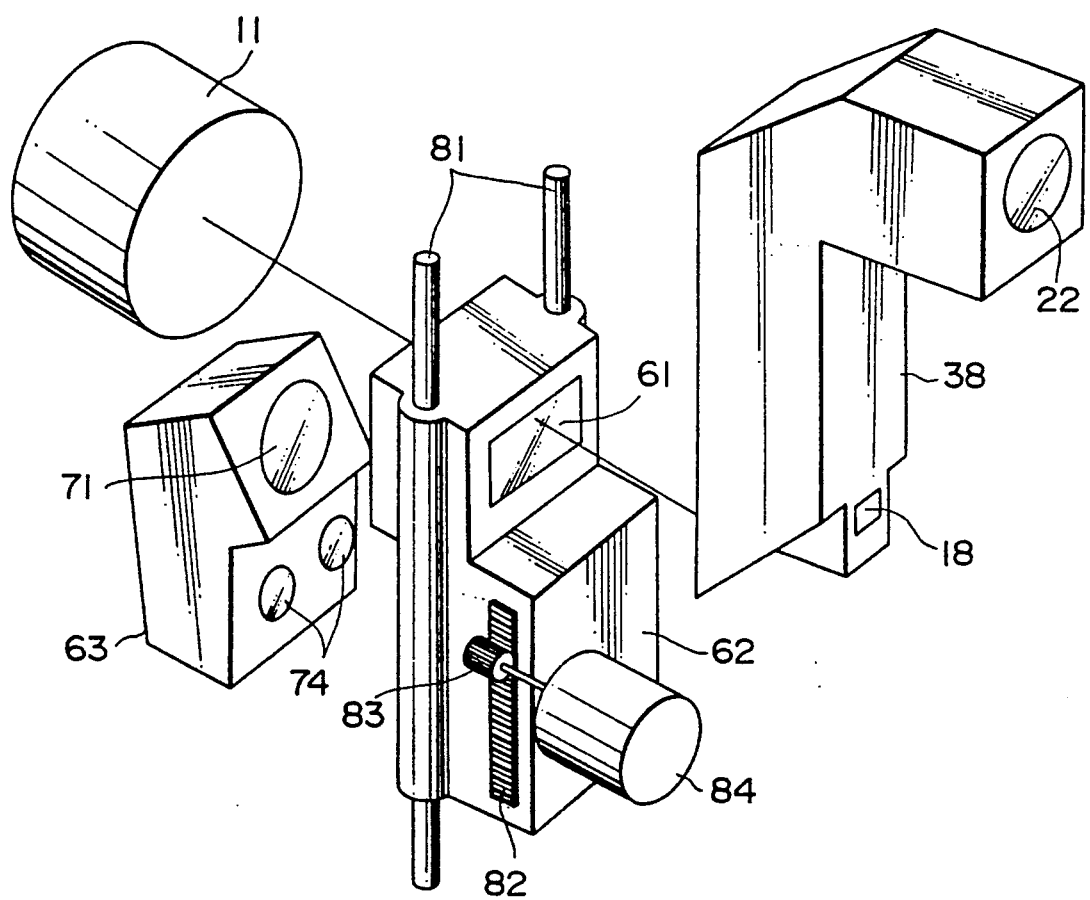
FIG. 13 is a perspective view of a shift mechanism of a board according to the second embodiment.

FIG. 13 illustrates a mechanism for vertically driving the base plate 62 according to a second embodiment of the present invention.

As shown in FIG. 13, a shift mechanism 15 comprises, shafts 81 secured to a chassis (not shown), rack 82 provided on the base plate 62, and a pinion 83 engaged with the rack 82 which is rotated by a pulse motor 84.

The pulse motor 84 is driven in response to a pulse, and the pinion 83 is rotated. The rack 82 and therefore the base plate 62 provided with the rack 82 are guided by the shafts 81 and vertically moved.

Although it is possible to move the beam splitter 61 independently of the CCD 14, the shift mechanism 15 can be simplified and therefore made compact when both of them is provided on the base plate 62 as this embodiment.

Figure 14:
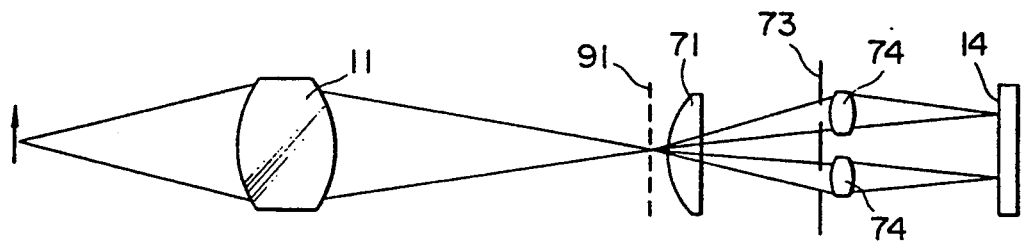
FIG. 14 is a schematic top view illustrating the principle of phase difference type focusing.

FIG. 14 is a top view illustrating the principle of focal point detection by means of the optical block (FIG. 13) utilizing a phase difference detecting method.

The light derived from an object is caused by the lens 11 to form an image on an imaging plane 91. The light from the imaging plane 91 is caused to be incident on the mask 73 via the field lens 71 where the rays of the light are divided into two, i.e., one passed through the upper half, and the other passed through the lower half of the lens 11. The rays of the light are incident on different positions of the CCD 14 via the separator lens 74, respectively.

The images on the CCD 14 resulting from these two groups of rays of the light move in opposite directions in accordance with the amounts and directions of the shift of the focus. As a result, the shift of the focus can be detected based upon the difference in length between the two images.

Since the CCD 14 has a two-dimensional (planar) pickup (photographing) area, a range of focusing can be enlarged two-dimensionally by utilizing the pickup area if an auxiliary optical system for detecting a phase different in another direction is added.

Figure 15:
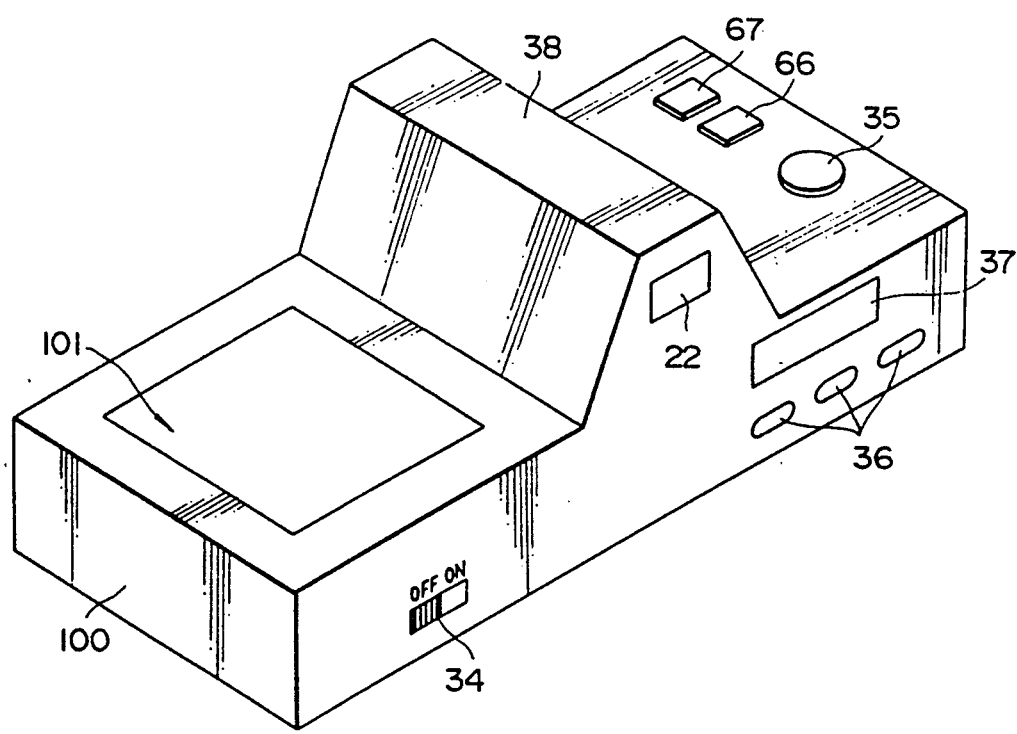
FIG. 15 is a perspective view of the second embodiment of an electronic still camera.

FIG. 15 shows a perspective view of the electronic still camera thus constructed as a second embodiment.

As shown in FIG. 15, the camera comprises a casing 100, a door 101 which is openable with respect to the casing 100. By opening the door 101, the magnetic disk 29 can be put into or taken out of the casing 100.

Figure 16:
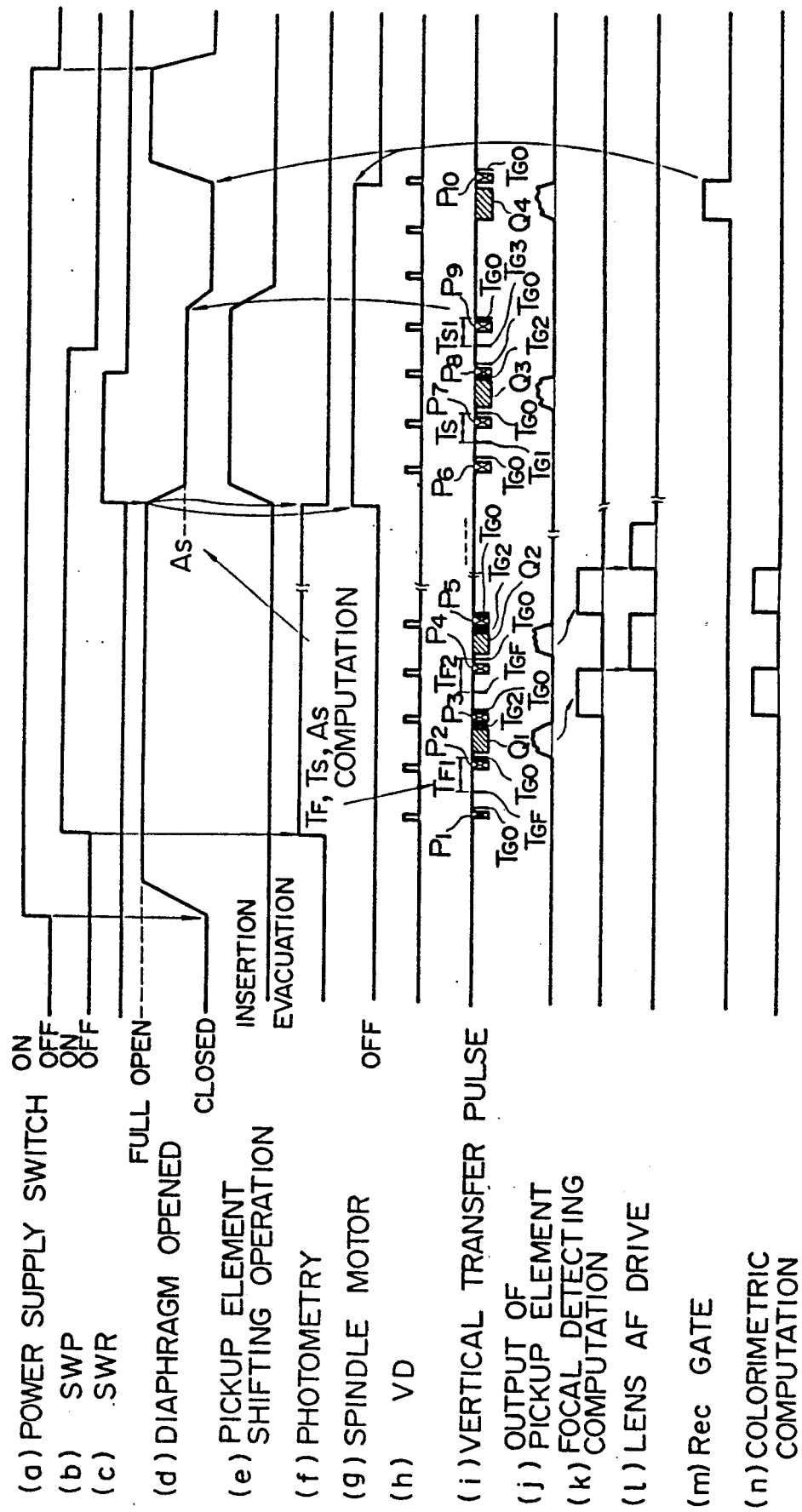
FIG. 16 is a timing chart illustrating the operation of the second embodiment.

The operation will subsequently be described with reference to a timing chart of FIG. 16.

When the power supply switch 34 is turned on, the completely closed state of the diaphragm 12 is changed to the completely opened one (FIG. 16(a), (d)).

The release switch 35 comprises switches 35P, 35R in two stages. When the release switch 35 is incompletely pressed, the switch 35P is turned on, whereas when completely pressed, the switch 35R is also turned on.

When the switch 35P is turned on, the system controller 33 computes the aperture value $A_s$, the operating time interval $T_s$ of the electronic shutter, and further the operating time interval $T_F$ ($T_{F1}$, $T_{F2}$) of the electronic shutter for focusing based upon the output of the photometric circuit 23 (FIGS. 16(b), (f)).

Unnecessary electric charges are first swept out in response to the high-speed sweep pulses $P_1$, $P_2$ which are generated synchronously with the vertical synchronous signal (FIG. 6(h)) for operating focal detecting computations. Electric charges are stored to the extent of the time interval $T_{F1}$ thus computed (the time interval during which optimum exposure time is obtained when the diaphragm 12 is fully opened) (FIG. 16(i)). The electric charge is read in response to the pulse $Q_1$ and stored in the image memory 59 (FIGS. 16(i), (j)).

When the electric charges are completely stored in the image memory 59, the system controller 33 reads data from the image memory 59 during the next field period in order to make focal detecting computations. The system controller 33 controls the automatic focus drive mechanism 68 to move the lens 11 based on the focal detecting computations during another field period (FIG. 16(k)).

The same operation is repeated several times (FIGS. 16(i) through (l)).

Note that the operating time intervals $T_{F1}$, $T_{F2}$ of the electronic shutter may be kept constant or sequentially changed likewise as aforesaid.

When the switch 35R is turned on, subsequently, the diaphragm 12 is set at the aperture value $A_s$, and the pulse motor 84 is driven, so that the CCD 14 is located into the luminous flux path of the lens 11, and the spindle motor 30 is also rotated (FIGS. 16(c) through (g)).

The electronic shutter is operated by the time interval $T_s$ and operated further by the time interval $T_{S1}$ computed based on the image signal obtained in the preceding stage (during the time interval $T_s$). The image signal thus accumulated is then read out with the diaphragm 12 being completely closed and recorded on the magnetic disk 29 (FIGS. 16(d), (i), (j), (m)).

As the charge storage time of the CCD 14 is appropriately controlled in accordance with the focusing and pickup (the aperture value and the speed of the electronic shutter), the dynamic range of light intensity is widened.

When the power supply switch 34 is turned off, the diaphragm 12 is closed (FIGS. 16(a), (d)).

FIG. 17 shows a second modification of the second embodiment wherein the inserting position of the beam splitter 61 differs.

In this modification, the beam splitter 61 is fixedly disposed between the field lens 16 and the relay lens 19. Moreover, the CCD 14 is so arranged to move independently.

In this case, the load of the shift mechanism 15 is made lighter than that in the embodiment of FIG. 10.

FIG. 18 shows a third modification of the second embodiment of the drive mechanism of the CCD 14.

In this third modification, the CCD 14 is so arranged as to revolve about a fulcrum 111 between a position in the luminous flux path of the lens 11 and another in the luminous flux path (outside the luminous flux path of the lens 11) of the separator lens 74.

FIGS. 19 through 22 show fourth through seventh modifications of the second embodiment wherein the photometric elements 18 are disposed at different positions.

Figure 19:
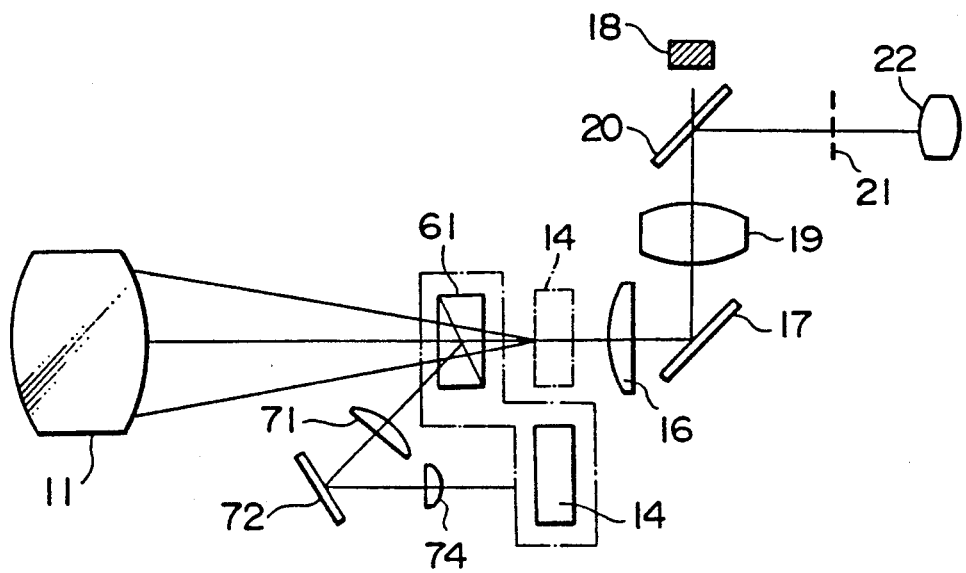
FIGS. 19 through 22 illustrate fourth through seventh modifications of the second embodiment.

In the fourth modification of FIG. 19, the photometric element 18 is disposed in the rear of the mirror 20. In this case, the mirror 17 should be formed with a total reflection mirror, whereas the mirror 20 should be formed with a half mirror.

Figure 20:
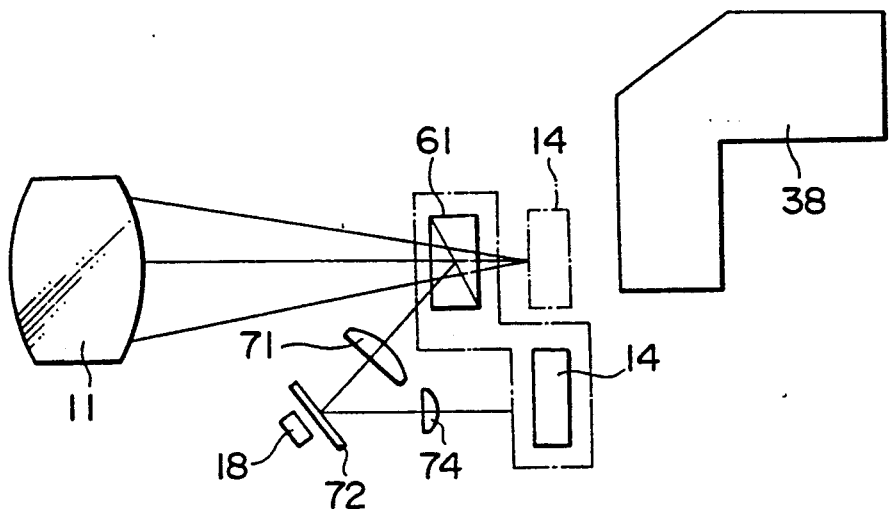

In the fifth modification of FIG. 20, the photometric element 18 is disposed in the rear of the mirror 72. In this case, the mirror 72 should be formed with a half mirror.

Figure 21:
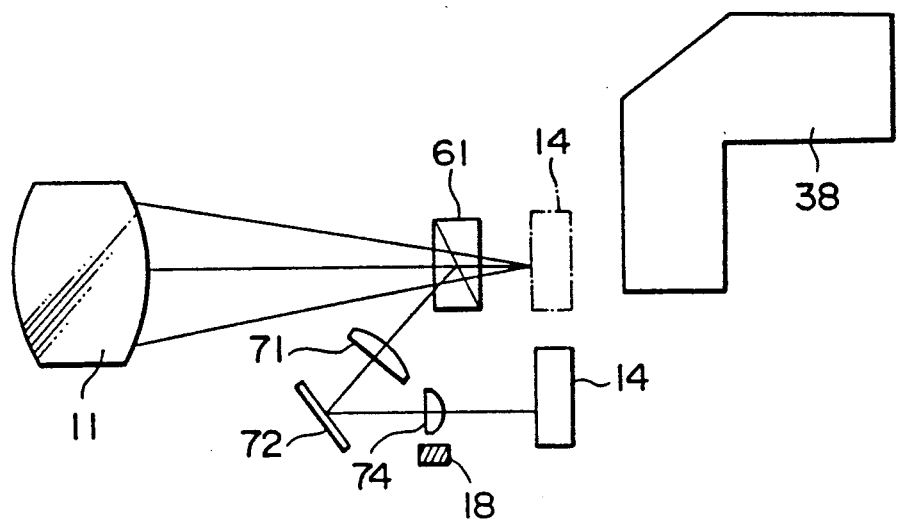

In the sixth modification of FIG. 21, the photometric element 18 is disposed under the separator lens 74. In this modification, part of the light reflected by the mirror 72 is incident to the separator photometric element 18.

Figure 22:
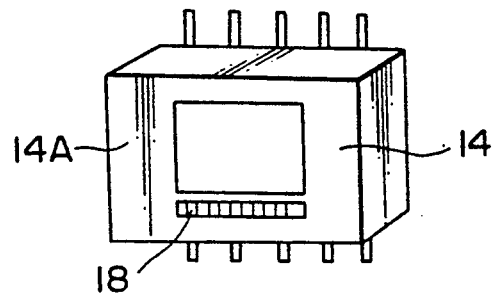

In the seventh modification of FIG. 22, the photometric element 18 is fitted to the package 14A of the CCD 14.

Figure 23A:
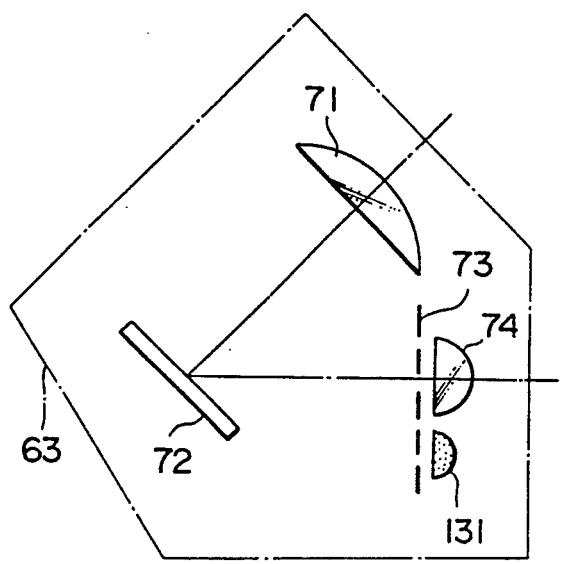
FIGS. 23A, 23B are a side and a top view of an eighth modification of the second embodiment having a diffusion optical element.
Figure 23B:
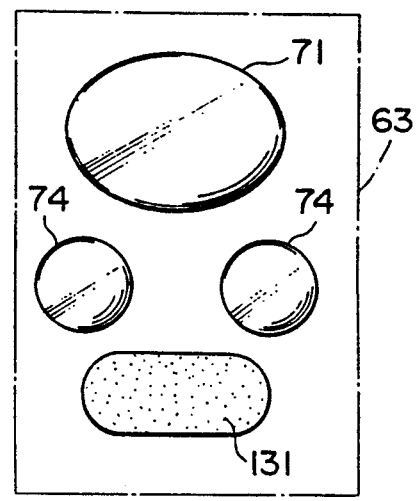

FIGS. 23A, 23B show an eighth modification of the second embodiment wherein a diffusion optical element for colorimetric purpose (for detecting color temperature) is added to the optical block 63.

In this modification, a diffusion optical element 131 is disposed under the separator lens 74, so that part of the light reflected from the mirror 72 is incident thereon. For this purpose, the mask 73 is also provided with holes for causing the light to be incident on the diffusion optical element 131 as well as the holes for separator lens 74.

Figure 24A:
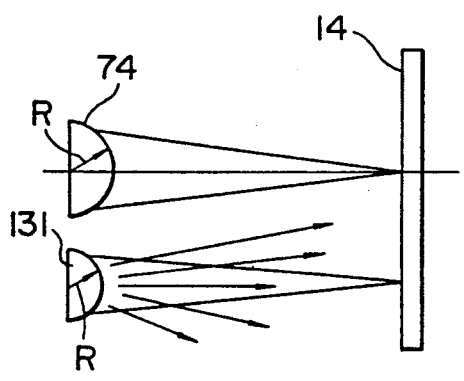
FIG. 24A, 24B are a side and a top view illustrating the operation of the diffusion optical element and the CCD.
Figure 24B:
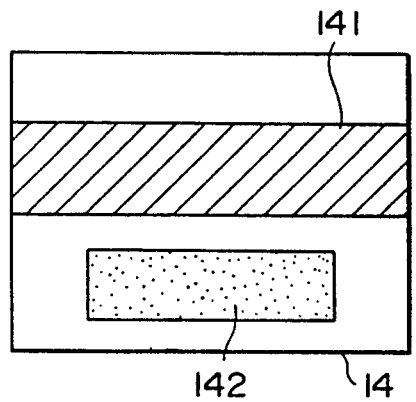

As shown in FIGS. 24A, 24B, when photometric (colorimetric) operation is executed, the CCD 14 is used in such a manner that the light from the separator 74 is incident on its area 141, and the light from the diffusion optical element 131 is incident on its area 142.

It is preferred for the diffusion optical element 131 to diffuse light sufficiently to the extent that the incident area 141 of the separator lens 74 remains unaffected. If radii at least in one direction of the separator lens 74 and the diffusion optical element 131 (e.g. within a plane in parallel to the surface of the paper in FIG. 24A are substantially equalized to be R as shown in FIG. 24A, the light passed through both separator lens 74 and the diffusion optical element 131 are focused on the CCD 14 at least in that direction, thereby the images formed by separator lens 74 and the diffusion optical element 131 can be clearly distinguished from each other at least in that direction.

Figure 25:
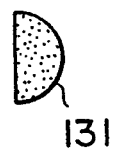
FIGS. 25 and 26 are side views of diffusion optical elements.
Figure 26:

Moreover, the diffusion optical element 131 may be provided in the form of a lens containing a number of particles for scattering light as shown in FIG. 25 or having a number of fringes (scattering surface) on its surface as shown in FIG. 26.

When color temperature is detected based on the light passed through the diffusion optical element 131, colorimetric computations may be operated at the same timing as focusing computations as shown in FIG. 16(n).

At this time, a color component (e.g., signal ratio of Red signal to Blue signal) of the area 142 is obtained to compute the white balance value. The gain of the color signal in the processing circuit 25 is controlled base upon the white balance value thus obtained.

As above, since optical systems for focal and color temperature detection are integrated by employing one CCD 14 for the focal point and color temperature detection, the system configuration is simplified.

Figure 27:
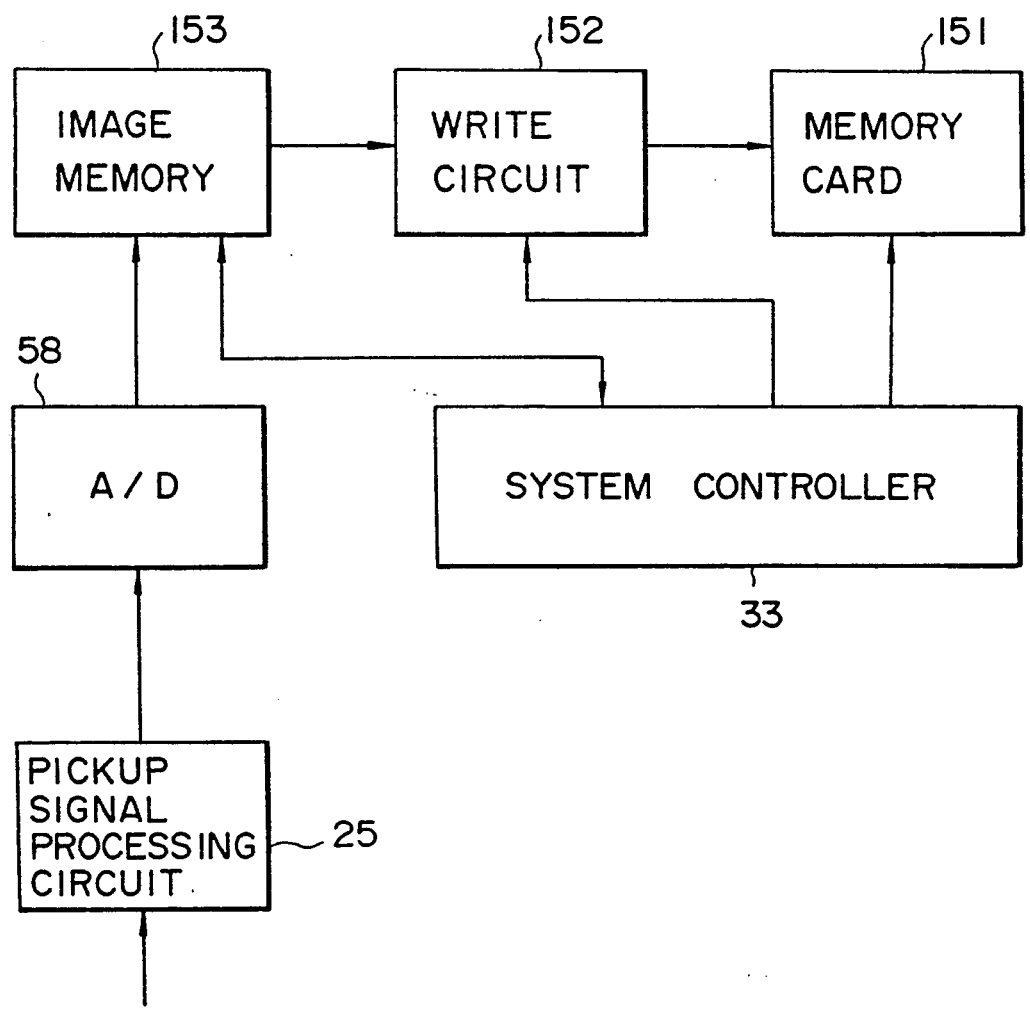
FIG. 27 is a block diagram illustrating the construction of the electronic still camera employing a memory card as a recording medium.

Although the magnetic head 27 has been employed as a recording means for recording image signals on the magnetic disk 29 in the embodiments/modifications shown above, a record circuit 152 may be employed as a recording means as shown in FIG. 27 in order to record image signals on a memory card 151 as a recording medium. Note that an image memory 153 for storing the output of the A/D converter 58 and supplying data to the record circuit 152 is required a capacity of large enough to store data for at least one field or one frame.

As set forth above, the electronic still camera is so arranged according to the present invention that the pickup (photographing) element is movably arranged in and out of the luminous flux path of the lens, which renders it possible to make an electronic still camera in the form of a single-lens reflex type without using the quick return mirror. Moreover, a lens having small back focal distance can be used. Therefore the diameter of the lens can be made smaller to obtain a desired f-number. Accordingly, an electronic still camera as a whole can be made compact.

Further, since the pickup element is arranged to be shifted such that the optical axis of the photographing lens crossed the light receiving surface of the pickup element when a photograph is taken in the embodiments, it can be arranged in such a manner that the light passed through the photographing lens is first incident to an optical member such as a mirror or a prism. Then the light passed through the optical member is incident to the light receiving surface of the pickup element when a photograph is taken.

With respect to the finder, a bright finder image is obtainable because the pickup luminous flux can be utilized effectively.

What is claimed is:

1. An electronic still camera for recording image data onto a recording medium, comprising:
   a photographing optical system that passes light from an object to be photographed and forms an image of said object;
   a pickup device that receives said light passed through said photographing optical system and outputs an image signal corresponding to said image, said image being formed on a light receiving surface of said pickup device;
   a driver that drives said pickup device to be shiftable between at least a first position where said light passing through said photographing optical system is incident to said pickup device, and a second position where said pickup device is located out of an optical path of said photographing optical system; and
   a recorder that records said image signal outputted from said pickup onto said recording medium.

2. The electronic still camera of claim 1, further comprising an optical element having a surface that crosses an optical axis of said photographing optical system, and a finder optical system that forms an image that corresponds to said light passed through said photographing optical system when said pickup dance is located at said second position, said light passing through said photographing optical system being directed to said finder optical system by said optical element, and wherein a computing means performs a range finding computation based on said image formed on said pickup device at said second position.

3. The electronic still camera of claim 2, wherein said optical element is movably arranged so as to be shiftable between an operative position, in which said light passing through said photographing optical system is directed to said finder optical system, and a non-operative position in accordance with a movement of said photographing optical system, said optical element being located at said operative position when said pickup device is located at said second position.

4. The electronic still camera of claim 1, wherein said pickup device is pivoted to be rotatable between said first and second positions.

5. The electronic still camera of claim 1, further comprising means for computing an exposure time and an aperture value based on said image signal that is outputted by said pickup device.

6. The electronic still camera of claim 5, further comprising a focusing switch, and wherein said computing means computes said exposure time and said aperture value when said focusing switch is turned ON.

7. The electronic still camera of claim 5, further comprising a diaphragm and a shutter that are operated in accordance with said exposure time and said aperture value computed by said computing means when said object is photographed.

8. The electronic still camera of claim 7, further comprising a power switch, said diaphragm being completely closed when said power switch is turned OFF.

9. The electronic still camera of claim 8, further comprising a release switch that is manipulated when said object is photographed, said diaphragm being completely opened when said power switch is turned ON while said release switch is turned OFF, and further wherein said diaphragm is set to said aperture value computed by said computing means when said power switch and said release switch are turned ON.

10. The electronic still camera of claim 7, wherein said shutter electrically actuates said pickup device when said object is photographed.

11. The electronic still camera of claim 7, further comprising an image memory for storing photographed image data by operating said diaphragm and said shutter based upon said exposure time and said aperture value computed by said computing means, and wherein said computing means computes at least a second exposure time and at least a second aperture value based on image data that has been precedingly stored in said image memory.

12. The electronic still camera of claim 1, further comprising an optical element that is arranged between said pickup device and said photographing optical system to cancel a moire phenomenon.

13. The electronic still camera of claim 12, wherein said optical element comprises an optical low-pass filter that cancels said moire phenomenon.

14. The electronic still camera of claim 12, wherein said optical element is fixably arranged between said photographing optical system and said first position, such that when said pickup device is located at said first position, said optical element is adjacent to said light receiving surface of said pickup device.

15. The electronic still camera of claim 12, wherein said optical element is arranged proximate said light receiving surface of said pickup device, both said pickup device and said optical element being driven to be located at at least said first position or said second position.

16. The electronic still camera of claim 1, further comprising:
   a focusing optical system that directs said light passing through said photographing optical system to be incident upon said pickup device when said pickup device is located proximate said second position; and
   a focus detector that detects a focal point based upon said image signal outputted by said pickup device when said pickup device is located proximate said second position.

17. The electronic still camera of claim 16, wherein a processor computes an aperture value that corresponds to said image signal outputted by said pickup device when said pickup device is located proximate said second position.

18. The electronic still camera of claim 1, further comprising:
   a colorimetric optical system that directs said light passing through said photographing optical system to be incident upon said pickup device when said pickup device is located proximate said second position; and
   a colorimetric detector that detects a color temperature of said object based upon said image signal outputted by said pickup device when said pickup device is located proximate said second position.

19. The electronic still camera of claim 18, further comprising a focus detector that detects a focal point based upon said image signal outputted by said pickup device when said pickup device is located proximate said second position.

20. The electronic still camera of claim 19, wherein said focus detector comprises a pair of lenses that form images of object on said pickup device, and wherein said colorimetric detector comprises another lens that forms a diffused color image of said object on said pickup device.

21. The electronic still camera of claim 20, wherein said pair of lenses and said another lens are arranged within a same plane.

22. The electronic still camera of claim 18, wherein said colorimetric detector comprises a light diffusion optical element that diffuses said light passing therethrough and projects said diffused light onto said light receiving surface of said pickup device.

23. The electronic still camera of claim 22, wherein said light diffusion optical element is arranged such that a portion of said light passing through said photographing optical system is incident to said light diffusion optical element.

24. The electronic still camera of claim 23, wherein said light diffusion optical element comprises a lens having a number of particles that scatters said light passing therethrough.

25. The electronic still camera of claim 23, wherein said light diffusion optical element comprises a lens having a number of scattering fringes on a surface thereof.

26. The electronic still camera of claim 1, further comprising a finder optical system, and wherein said pickup device prevents said light passing through said photographing optical system from being incident upon said finder optical system when said pickup device is located proximate said first position.

27. The electronic still camera of claim 26, wherein said finder optical system has a finder optical element that is arranged to cross an optical axis of said photographing optical system and a pentagonal prism, said light passing through said photographing optical system being orthogonally changed in its direction and directed to said pentagonal prism by said finder optical element when said pickup device is located proximate said second position.

28. The electronic still camera of claim 26, wherein said finder optical system is coaxially arranged with said photographing optical system when said pickup device is located proximate said second position.

29. The electronic still camera of claim 1, wherein said recording medium comprises a memory card.

30. The electronic still camera of claim 1, wherein said pickup device comprises an inter-line type CCD (Charge Coupled Device).

31. A still camera for recording image data onto a recording medium, comprising:
   a photographing optical system that passes light from an object to be photographed and forms an image of said object;
   a finder optical system for receiving light passed through said photographing optical system;
   a pickup device that receives said image of said object from said photographing optical system and outputs an image signal that corresponds to said image of said object;
   a positioner that positions said pickup device at a first position where said pickup device is interposed between said photographing optical system and said finder optical system when photographing is executed, and for positioning said pickup device at a second position where said pickup device is located out of an optical path of said photographic optical system; and
   a recorder that records said image signal from said pickup device onto said recording medium.

32. The electronic still camera of claim 31, wherein said first position comprises a position where said pickup device prevents said light passed through said photographing optical system from being incident to said finder optical system.

33. A still camera for recording image data onto a recording medium, comprising;
   an optical system that passes light from an object to be photographed and forms an image of said object;
   a photometric unit that detects a brightness of said object in accordance with said light that passes through said optical system;
   a pickup device that receives said image of said object from said optical system and outputs an image signal that corresponds to said image, said pickup device being shiftable between a first position where said pickup device is interposed with an optical path of said optical system and a second position where said pickup device is located out of said optical path of said optical system;

an aperture that limits an amount of said light that forms said image that is received by said pickup device;

means for calculating an aperture value and a shutter speed based upon an output of said photometric unit;

a recorder that records said image signal outputted from said pickup device onto said recording medium;

release means for initiating a photographing operation; and a positioner that positions said pickup device to said first position and executes said photographing operation in accordance with said aperture value and said shutter speed calculated by said calculating means when said release means is operated.

34. A still camera for recording image data onto a recording medium, comprising:

an optical system that passes light from an object to be photographed and forms and image of said object;

a finder optical system for receiving light passed through said optical system;

a filter member that is fixably arranged between said optical system and said finder optical system;

a pickup device that receives said image of said object from said optical system and outputs an image signal that corresponds to said image;

a positioner that positions said pickup device at a first position where said pickup device is interposed between said optical system and said finder optical system when photographing is executed, and for positioning said pickup device at a second position where said pickup device is located out of said optical path of said optical system; and a recorder that records said image signal outputted from said pickup device onto said recording medium.

35. A still camera for recording image data onto a recording medium, comprising:

an optical system that passes light from an object to be photographed and forms an image of said object;

a finder optical system that receives said light that passes through said optical system;

a pickup device that receives said image of said object and outputs an image signal that corresponds to said image;

a filter member that is provided in front of said pickup device for allowing said light passing through said optical system to pass through said filter member;

a positioner that positions said pickup device at a first position where said pickup device is interposed between said optical system and said finder optical system when photographing is executed, and for positioning said pickup device at a second position where said pickup device is located out of an optical path of said optical system; and a recorder that records said image signal outputted from said pickup device onto said recording medium.

36. A still camera for recording image data onto a recording medium, comprising:

a first optical system that passes light from an object to be photographed and forms an image of said object;

a finder optical system that receives light passed through said first optical system;

a pickup device that receives said image of said object formed by said first optical system and outputs an image signal corresponding to said image;

a positioner that positions said pickup device at a first position where said pickup device is interposed between said first optical system and said finder optical system when photographing is executed, and for positioning said pickup device at a second position where said pickup device is located out of an optical path of said first optical system; and a focusing detector that detects a focusing condition based upon said outputted image signal from said pickup device when said pickup device is located at said second position.

37. The still camera of claim 36, further comprising:

a second optical system that is used for a focusing operation; and means for separating said light that passes through said first optical system towards said finder system and towards said second optical system.

38. A still camera for recording image data onto a recording medium, comprising:

a pickup device that receives an object image and outputs an image signal that corresponds to said object image;

an electronic shutter that controls a period of time in which said pickup device receives said object image;

an aperture that controls an amount of light that is allowed to be incident to said pickup device;

a positioner that positions said pickup device at a first position when a photographing operation is executed, and for positioning said pickup device at a second position when said photographing operation is not executed, a photometric operation being executed when said pickup device is positioned at said second position; and a driver that drives said aperture and said electronic shutter in such a fashion that when said photometric operation is executed, said electronic shutter being driven with a first appropriate shutter speed with said aperture being fully opened, while said photographing operation is executed with a second appropriate shutter speed and appropriate aperture value, respectively.

39. A still camera, comprising:

a two-dimensional pickup device that receives an object image to be recorded;

a positioner that positions said pickup device at a first position when a photographing operation is being executed, and positions said pickup device at a second position when said photographing operation is not being executed;

an optical system that directs said object image to said pickup device when said pickup device is located at said second position, said optical system including a focusing optical system that forms an image to be used for detecting a focusing condition and a colorimetric optical system for forming an image to be used for detecting a color temperature of said object; and a detector that detects said focusing condition of said object image in accordance with said object image received by said pickup device when said pickup device is located at said second position.

* * * * *

UNITED STATES PATENT AND TRADEMARK OFFICE
CERTIFICATE OF CORRECTION

PATENT NO. : 5,294,990
DATED : March 15, 1994
INVENTOR(S) : Harumi AOKI

It is certified that error appears in the above-indentified patent and that said Letters Patent is hereby corrected as shown below:

At column 12. line 4 (claim 2. line 6) change "dance" to ---device---

At column 15. line 20 (claim 34. line 4) change "and" (second occ.) to read--an--.

Signed and Sealed this

Twenty-seventh Day of February, 1996

Attest:

BRUCE LEHMAN

Attesting Officer    Commissioner of Patents and Trademarks